Dec. 10, 1957   H. E. KIBBE   2,815,939
FOOD MIXER
Filed June 27, 1955

INVENTOR
HARLOW E. KIBBE
BY R. J. Eisinger
ATTORNEY

United States Patent Office 2,815,939
Patented Dec. 10, 1957

2,815,939

FOOD MIXER

Harlow E. Kibbe, West Springfield, Mass., assignor to Westinghouse Electric Corporation, East Pittsburgh, Pa., a corporation of Pennsylvania Application June 27, 1955, Serial No. 518,022

3 Claims. (Cl. 259—1)

This invention relates to a food mixer, more particularly to a device, commonly known as a beater ejector, for releasing or ejecting the beater or beaters from the detachable connection with the power unit or driving mechanism.

The object of the invention is to provide an improved beater ejector; more specific objects being to provide an ejector that is devoid of substantial projections from the motor head and to limit the movement of the ejector.

These and other objects are effected by the invention as will be apparent from the following description taken in connection with the accompanying drawing, forming a part of this application, in which.

Figure 1:
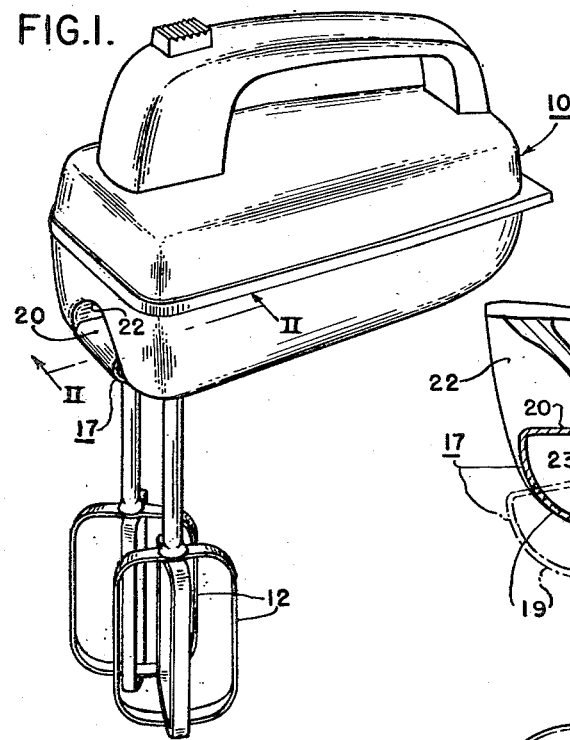
Fig. 1 is a perspective view of a food mixer in accordance with my invention.

Referring to the drawings in detail, there is shown a food mixer comprising a power unit which includes a casing 10 that houses a motor and a gear mechanism, which may be of conventional construction and which are therefore not shown. The gear mechanism drives two beater receiving sleeves or spindles 11, which rotate in opposite directions in a manner well known in the art. In the illustrated embodiment, there are two beaters 12, the shafts of which extend upwardly into the spindles 11. The shaft of each beater has pressed out ears 13 which are inserted in slots 14 in the spindles 11 to provide driving connection therewith, and a snap ring 15 seated in an annular groove in the spindle 11 is adapted to resiliently engage the undersides of the ears 13 to detachably retain the shaft in operative relation in the spindle 11. Each of the shafts is provided with an upwardly facing shoulder just below the bottom of the casing 10, which shoulder is formed in the illustrated embodiment by a collar 16 secured to the shaft in fixed relation thereto.

Figure 2:
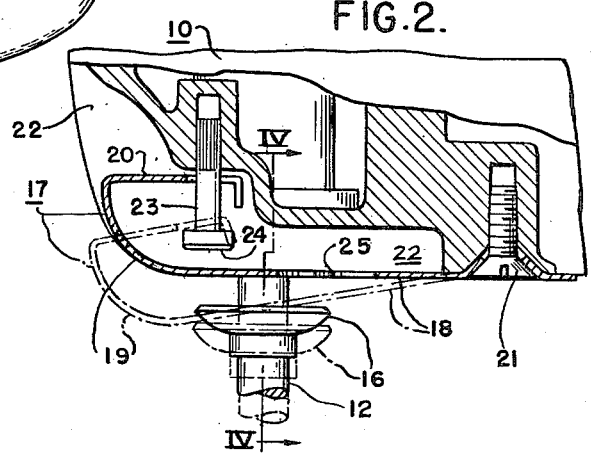
Fig. 2 is a fragmentary vertical sectional view taken on the line II—II of Fig. 1.
Figures 3, 4:
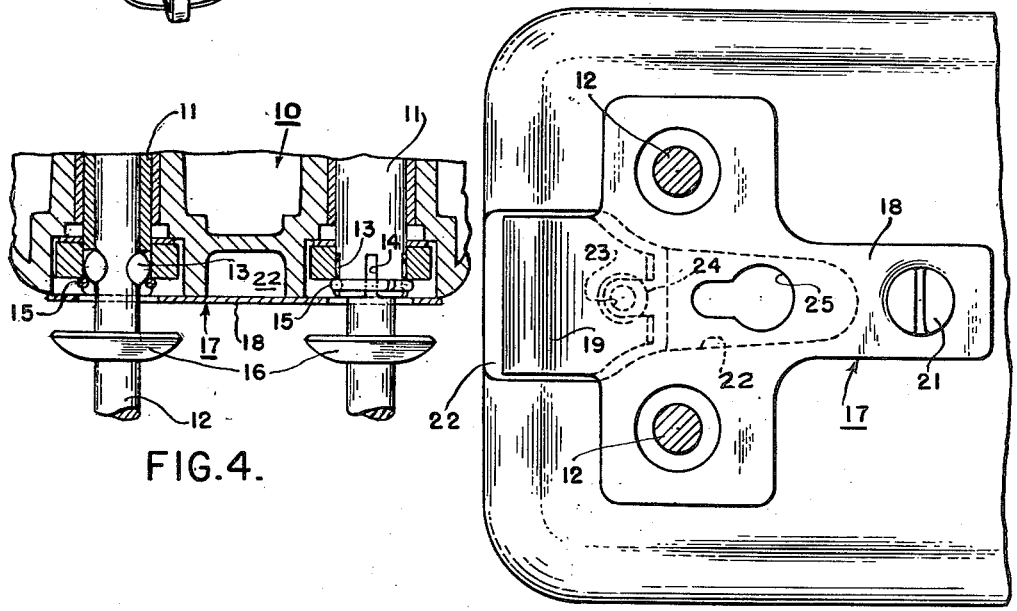
Fig. 3 is a bottom plan view.
Fig. 4 is a cross-sectional view taken on the line IV—IV of Fig. 2.

The beater ejector of this invention comprises a strip 17 of resilient sheet metal, such as steel. The strip 17 is bent to form first the lower horizontal leg 18, then upwardly to provide a curved portion 19, and it is then bent reversely to form an upper horizontal leg 20. The strip is fastened to the housing 10 by means of a screw 21 which extends through an opening in the leg 18 at the end remote from the curved portion 19. It will be noted that the lower leg 18 extends along the bottom or the bottom wall of the casing between such bottom and the collar 16 of the beaters, and closes the bottom of a recess 22 formed in the casing 10 adjacent the bottom and the end of the casing. As will be seen in Fig. 3, the lower leg 18 has side projections extending around the beater shafts to provide engagement with the collars 16. The leg 18 is provided with suitable openings, as shown in Fig. 4, through which the beater shafts extend. The curved portion 19 extends along or substantially flush with the end wall of the casing 10, and closes a portion of the recess adjacent the end of the casing. While the curved portion is shown in Fig. 1 as projecting slightly beyond the end of the casing, for clarity of illustration, it is preferably disposed entirely within the end surface as shown in Fig. 2. The recess 22, at the end of the casing 10, extends above the leg 20 to permit one to insert his finger or thumb to engage the leg 20 for moving the strip 17 downwardly.

To limit the downward movement of the ejector strip 17, a pin 23 is fastened to and extends downwardly from the structure of the casing 10 and has a head 24 at its lower end to form a stop to engage the leg 20. The downwardly extending portion of the pin 23 including the head 24 is disposed within the recess 22. The end of the leg 20 is bifurcated to accommodate the pin 23, as shown in Fig. 3.

To remove the beaters from the power unit, one inserts his thumb or finger in the recess 22 and engages the leg 20 and moves the strip downwardly until movement is stopped by engagement of the leg 20 with the head 24. During this movement, the lower leg 18 engages the collars 16 and forces the beaters downwardly. The ears 13 spread the spring snap rings 15 and move downwardly sufficiently so that the center of the ears 13 is below the rings 15, whereupon the beaters are released from the retaining effect of the rings 15 and drop down.

The lower leg 18 of the strip 17 may be formed with a key-hole slot 25, to permit hanging up the motor head after the beaters are detached therefrom.

From the above description, it will be appreciated that there is provided a beater ejector wherein objectionable projections are eliminated and wherein the movement of the beater ejecting strip is limited to prevent the deflection of the spring.

The pin 23 also serves to maintain the spring strip in alignment.

While the invention has been shown in but one form, it will be obvious to those skilled in the art that it is not so limited, but is susceptible of various changes and modifications without departing from the spirit thereof.

What is claimed is:

1. In a food mixer, the combination with a power unit having a casing including a bottom and an end, and a beater detachably connected to said power unit to be driven thereby, said beater extending downwardly through said bottom and having a shoulder near said bottom, of means for ejecting said beater comprising a strip of spring sheet metal having a portion secured at one end thereof to said power unit and extending adjacent said bottom and said shoulder to the end of said power unit and the remainder of the strip being bent reversely and extending on the inner side of the said portion of the strip, and a stop carried by said power unit and adapted to engage said reversely bent portion to limit movement of said strip away from said power unit, said strip being adapted, upon movement away from the power unit and before engaging said stop, to engage said shoulder and release said beater from said detachable connection with the power unit.

2. The combination set forth in claim 1 wherein said casing is formed with a recess at the end thereof to permit insertion of a finger to engage said strip for moving the same to release said beater.

3. In a food mixer, the combination with a power unit having a casing including a bottom and an end, and a beater detachably connected to said power unit to be driven thereby, said beater extending downwardly through said bottom and having a shoulder near said bottom, of means for ejecting said beater comprising a strip of spring sheet metal having a portion secured at one end thereof to said power unit and extending adjacent said bottom and said shoulder to the end of said power unit and the remainder of the strip being bent reversely and extending on the inner side of the said portion of the strip, and a stop carried by said power unit and adapted to engage said reversely bent portion to limit movement of said strip away from said power unit, said strip being adapted, upon movement away from the power unit and before engaging said stop, to engage said shoulder and release said beater from said detachable connection with the power unit, said casing having a recess therein adjacent the bottom and said end, said reversely bent part of the strip and said stop being disposed in said recess, and said recess being substantially closed at the bottom by the said portion of said strip.

References Cited in the file of this patent
UNITED STATES PATENTS 2,048,455     Knapp _____ July 21, 1936